United States Patent
Phelps et al.

(10) Patent No.: US 10,756,471 B1
(45) Date of Patent: Aug. 25, 2020

(54) SHIELD GROUNDING ELECTRICAL CONNECTORS

(71) Applicant: TE Connectivity Corporation, Berwyn, PA (US)

(72) Inventors: Charles L. Phelps, Greensboro, NC (US); Michael S. Glick, Winston-Salem, NC (US); Matthew G. Price, Winston-Salem, NC (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

(21) Appl. No.: 16/431,414

(22) Filed: Jun. 4, 2019

(51) Int. Cl.
| | |
|---|---|
| H01R 13/187 | (2006.01) |
| H01R 13/17 | (2006.01) |
| F16F 1/04 | (2006.01) |
| H01R 9/05 | (2006.01) |
| H01R 13/58 | (2006.01) |
| H01R 13/24 | (2006.01) |

(52) U.S. Cl.
CPC ........... H01R 13/187 (2013.01); F16F 1/045 (2013.01); H01R 9/0518 (2013.01); H01R 9/0527 (2013.01); H01R 13/17 (2013.01); H01R 13/2421 (2013.01); H01R 13/5808 (2013.01)

(58) Field of Classification Search
CPC .................................................. H01R 13/187
See application file for complete search history.

(56) References Cited

U.S. PATENT DOCUMENTS

| | | | | | |
|---|---|---|---|---|---|
| 6,464,538 | B2* | 10/2002 | Miyazaki | ........... | H01R 13/6589 439/607.44 |
| 6,530,789 | B2* | 3/2003 | Konda | ................. | H01R 9/0518 439/98 |
| 8,562,377 | B2* | 10/2013 | Kawamura | ............ | H01R 9/032 439/607.44 |
| 10,128,611 | B2 | 11/2018 | Rhein et al. | | |
| 2015/0017829 | A1* | 1/2015 | Ishikawa | ................ | H01R 9/032 439/460 |

\* cited by examiner

*Primary Examiner* — Ross N Gushi

(57) ABSTRACT

Cable shield grounding electrical connectors comprise a cable having a cable shield, an inner insulating sleeve disposed radially inwardly from the cable shield, and an inner conductor radially inward of the inner insulating sleeve. An inner ferrule includes an outer surface, wherein a portion of the cable shield is disposed along at least a portion of the inner ferrule outer surface. An outer ferrule comprises a first section that is disposed concentrically around the inner ferrule, and wherein the portion of the cable shield is interposed between and in direct contact with each of the inner ferrule and the outer ferrule first section, thereby forming an assembly. The connector comprises a housing having an inner cavity and wherein the assembly is disposed within the inner cavity. An electrically interconnecting element is interposed between the assembly and the housing to provide a grounding electrical connection therebetween.

20 Claims, 4 Drawing Sheets

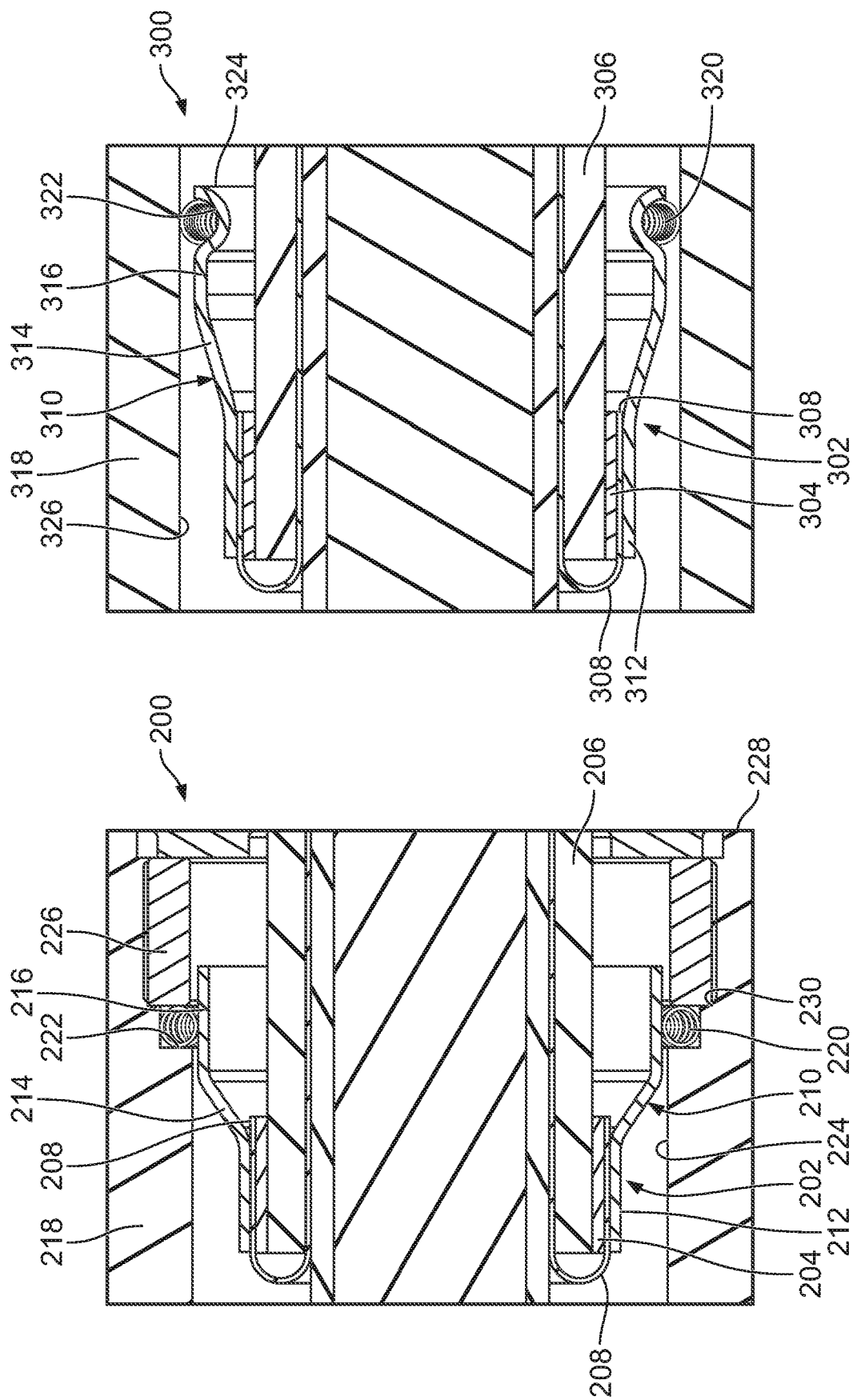

SHIELD GROUNDING ELECTRICAL CONNECTORS

FIELD

Electrical connectors as disclosed herein are used with shielded cables such as those used in high power transmission applications and, more specifically relate to electrical connectors that are specially configured to provide a highly reliable cable shield connection for grounding purposes in a manner that is resistant to vibration and that avoids unwanted contact of the cable shield with the cable main conductor.

BACKGROUND

The use of electrical connectors configured to provide a connection between the shield of a shielded cable and a connector housing for grounding purposes is known in the art. The need to provide an effective and robust grounding of shielded cables is especially important in high-power applications such as in the hybrid and electrical Industrial and Commercial Transportation (ICT) industry that call for high levels of EMI protection and resistance to high vibration for functional and safety reasons. Such conventional electrical connectors currently used in these demanding applications often utilize non-conductive materials such as plastic for the connector housing and sheet metal shielding components for EMI protection. During the course of use, such conventional connectors comprising such sheet metal components often fail under conditions of high vibration, and thus do not provide a grounding construction that adequately addresses the need to provide reliable EMI protection as called for in such end-use applications.

It is, therefore, desired that electrical connectors be constructed in a manner that provides an effective and robust degree of shielded cable grounding under conditions of high vibration, to thereby address the need not adequately met by conventional connectors to provide a high degree of EMI protection and resistance to vibration to extend the effective service life of such connectors while improving the degree of reliable power transmission in such end-use applications.

SUMMARY

Cable shield grounding electrical connectors as disclosed herein generally comprise a cable having a cable shield, an inner insulating sleeve disposed radially inwardly from the cable shield, and an inner conductor radially inward of the inner insulating sleeve. An inner ferrule includes an inner surface and an outer surface, wherein a portion of the cable shield is disposed along at least a portion of the inner ferrule outer surface. An outer ferrule comprises a first section that is disposed concentrically around the inner ferrule, and wherein the portion of the cable shield is interposed between and in direct contact with each of the inner ferrule and the outer ferrule first section. The so combined inner and outer ferrule form an assembly.

The outer ferrule includes a second section that extends axially away from the outer ferrule first section and that has an enlarged diameter relative to the outer ferrule first section. In an example, the inner and outer ferrules are each formed from an electrically conductive material. In an example, the inner ferrule includes a first section that is in contact with the portion of the cable shield and a second section that extends axially away from the inner ferrule first section and that has an enlarged diameter relative to the inner ferrule first section, wherein the outer ferrule first section is disposed concentrically around the inner ferrule first section. In an example, the outer ferrule second section and inner ferrule second sections are oriented at axially opposite ends of the assembly. In an example, an annular spacer is interposed between the cable inner insulating sleeve and an inner surface of the inner ferrule first section. In an example, the outer ferrule first section includes a terminal end that is flared outwardly to complement an outer surface of the inner ferrule second section, and wherein a portion of the cable shield is interposed therebetween. In an example, the cable further comprises an outer insulating sleeve radially outwardly from the cable shield, and wherein an inside surface of the inner ferrule is disposed over the outer insulating sleeve and the portion of the cable shield is disposed around a terminal end of the outer insulating sleeve and onto the outer surface of the inner ferrule.

The connector comprises a housing having an inner cavity and wherein the assembly is disposed within the inner cavity, wherein an electrically interconnecting element is interposed between the assembly and the housing to provide an electrical connection therebetween. In an example, the interconnecting element is in the form of a canted coil spring extending circumferentially between and contacting opposed surfaces of the assembly and the housing inner cavity. In an example, the canted coil spring is an annular element that is disposed within a recessed section of the housing inner cavity. In an example, the canted coil spring is an annular element that is disposed within a recessed section along an outer surface of the outer ferrule.

Shield grounding electrical connectors as disclosed herein provide a grounding electrical connection with a cable that is robust and resistant to vibration by interposing the cable shield portion of the cable between the inner and outer ferrules thereby forming the assembly. The assembly is then inserted into the connector housing inner cavity whereby the interconnecting element, e.g., canted coil spring, provides a resilient and robust grounding electrical compressed contact between the opposed circumferential outside surface of the assembly and housing inner cavity. As the canted coil spring is fixed axially relative to one of the assembly or the housing inner cavity, such permits repeated insertion and removal without compromising the ability to provide the desired robust grounding electrical connection therebetween in a manner that is resistant to vibration.

BRIEF DESCRIPTION OF THE DRAWINGS

Shield grounding electrical connectors as disclosed herein will now be described by way of example with reference to the accompanying figures, of which:

FIG. 4 is a cross-sectional side view of another example shield grounding electrical connector as disclosed herein; and FIG. 5 is a cross-sectional side view of a still another example shield grounding electrical connector as disclosed herein.

DETAILED DESCRIPTION

Figure 1A:
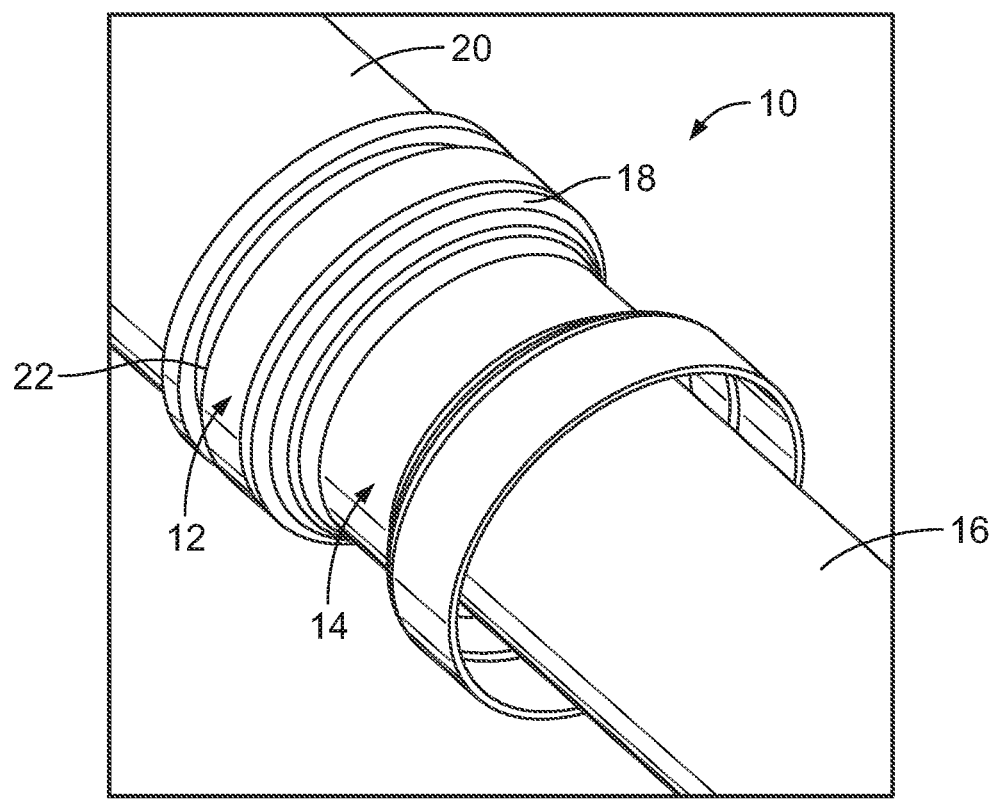
FIG. 1A is a perspective view of an example inner and outer ferrule assembly as used with shield grounding electrical connectors as disclosed herein.

Embodiments of shield grounding electrical connectors as disclosed herein will be described hereinafter in detail with reference to the attached drawings, wherein like reference numerals refer to like elements. Shield grounding electrical connectors as disclosed herein may, however, be embodied in many different forms and should not be construed as being limited to the embodiments set forth herein; rather, these embodiments are provided so that the disclosure will be thorough and complete, and will fully convey the concept of shield grounding electrical connectors to those skilled in the art.

Shield grounding electrical connectors as disclosed herein are generally configured comprising an inner ferrule, and an outer ferrule that are each specially configured having sections that cooperate with one another to accommodate shielding from a shielded cable therebetween and that are crimped together to fixedly capture the shielding therebetween, thereby forming an inner and outer ferrule assembly. Each of the inner and outer ferrules are also configured to ensure that the shielding interposed and captured therebetween does not contact the power cable main conductor. Further, the outer ferrule is specially configured to connect with a housing construction for purposes of providing a grounded electrical connection of the cable shield with the housing in manner that is robust and resistant to high levels of vibration, thereby providing a high level of reliable EMI protection as called for by certain end-use applications such as power transmission in the hybrid and electrical ICT industry.

FIG. 1A illustrates an example inner and outer ferrule assembly 10 as used with shield grounding electrical connectors as disclosed herein. The assembly 10 comprises an inner ferrule 12 that is coupled together with an outer ferrule 14, wherein a shielded cable 16 is disposed through an inside diameter of both the inner and outer ferrules 12 and 14, and a shield portion 18 of the cable is interposed between and captured by opposed surfaces of the inner and outer ferrules 12 and 14. A terminal insulator 20 is shown interfaced and/or otherwise engaged with an axial end 22 of the inner ferrule 12 opposite the outer ferrule 14.

Figure 1B:
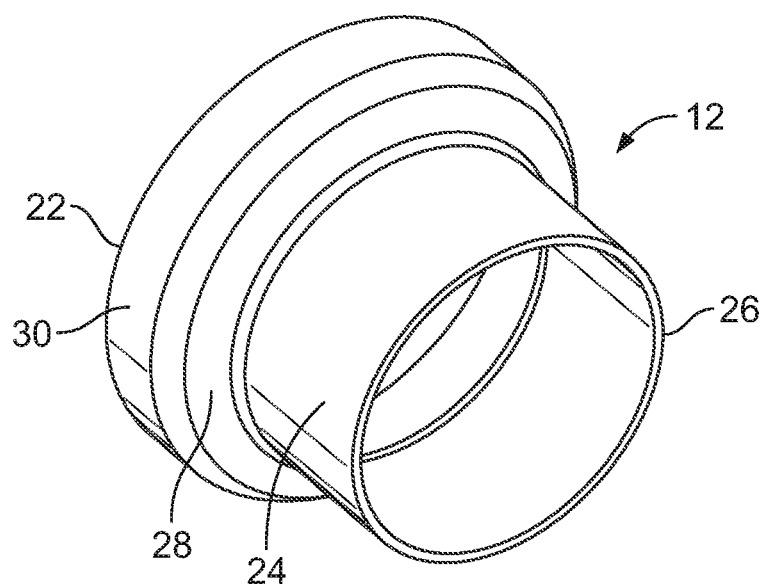
FIG. 1B is a perspective view of an example inner ferrule of the example inner and outer ferrule assembly of FIG. 1A.

Referring to FIG. 1B, the inner ferrule 12 is shown in an example having an annular configuration with a first section or neck 24 that extends axially a distance from an axial end 26 of the inner ferrule to a shoulder section 28 that extends radially outwardly from the neck 24 and in an axial direction towards end 22. In an example, the shoulder section 28 may have an angle of departure as measured along an axis running axially parallel to the neck of less than about 90 degrees, from about 30 to 85 degrees, and from about 45 to 70 degrees. In an example, the neck section 24 is sized having an inside diameter that fits over the shielded cable, and in an example that fits over a section of the shielded cable after an outer insulating sleeve of the cable has been removed to expose the shield portion of the cable, and after the shield portion has been moved radially outward to expose a cable inner insulating sleeve. In an example, the neck section has a constant diameter. The shoulder section 26 extends radially outwardly to a skirt section 30 that extends axially a distance therefrom to the axial end 22. In an example, the skirt section may be configured to cooperate with an end section of a connector terminal 20 and the like to facilitate an attachment therewith. In an example, the skirt section 30 has a constant diameter.

In an example, the inner ferrule 12 is formed from an electrically conductive material that has a desired degree of structural rigidity while also being capable of being deformed in a crimping operation to join the inner and outer ferrules together and trap the shield portion of the cable therebetween. Example electrically conductive materials useful for forming the inner ferrule include metals and metal alloys. In an example, the inner ferrule is made from copper or copper alloy. In an example, the inner ferrule is a one-piece construction that may be formed having the desired configuration by conventional molding or stamping techniques.

Figure 1C:
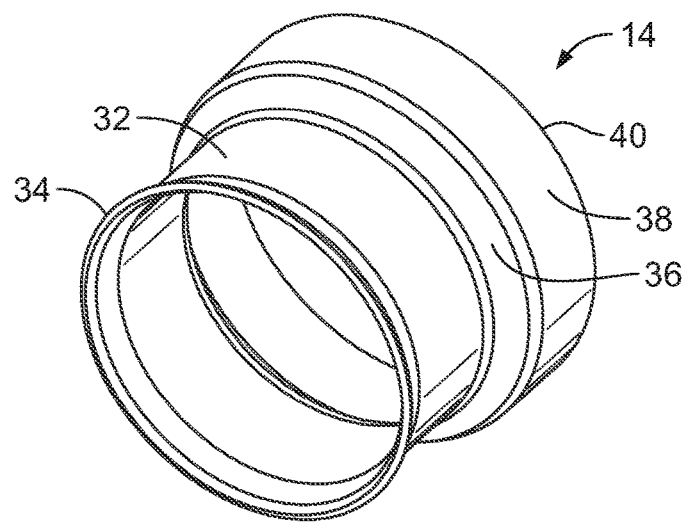
FIG. 1C is a perspective view of an example outer ferrule of the example inner and outer ferrule assembly of FIG. 1A.

FIG. 1C illustrates the outer ferrule 14 configured having an annular configuration with a first section or neck 32 that extends axially a distance from an axial end 34. In an example, the axial end 34 is flared radially outwardly a distance for purposes of placement adjacent the inner ferrule shoulder section 28 when the inner and outer ferrules are joined together. In an example, the neck section 32 has an inside diameter that is sized to fit over the inner ferrule neck section 24. In an example, the inner ferrule neck section outside diameter and the outer ferrule neck section inside diameter are sized to accommodate placement of the outer ferrule neck section over the inner ferrule neck section after the cable shield portion has been disposed over the inner ferrule neck section. Thereafter, the two neck sections of the inner and outer ferrule may be attached together by a crimping process to mechanically trap the cable shield portion therebetween, thereby forming the inner and outer ferrule assembly.

In an example, the axial end 34 may have an outward angle of departure as measured from an axis running axially through the outer ferrule 14 of greater than about 2 degrees, and from about 5 to 60 degrees. In an example, it is desired that the axial end 34 have an angle of departure that is less than that of the inner ferrule shoulder section 28 for purposes of tightly capturing the shield portion of the cable therebetween. The outer ferrule neck section 32 extends axially a distance from the axial end 34 to a shoulder section 36 that extends radially outwardly therefrom to a skirt section 38 that extends axially from the shoulder section to an axial end 40 of the outer ferrule. In an example, the shoulder section 36 may have an angle of departure as measured along an axis running axially through the outer ferrule of less than about 90 degrees, from about 10 to 80 degrees, and from about 25 to 60 degrees. Functionally, it is desired that the shoulder section 36 have an angle of departure that facilitates passage of the outer ferrule into a housing inner cavity and engagement and passage along an interconnection element without causing binding of the inner and outer ferrule assembly within the inner cavity as will be described below. In an example, it is desired that the inner ferrule and outer ferrule neck sections extend an axial length that is similar to provide similar cable shield portion surface contact areas therebetween. The outer ferrule skirt section 38 is configured having an outer diameter that is sized to accommodate axial movement within a housing and make an electrical grounding connection therewith. The outer ferrule skirt section 38 has an inside diameter that is sized to accommodate placement of the shielded cable therethrough. The outer ferrule may be made from the same types of electrically conductive materials and may be formed as described above for the inner ferrule.

Figure 2:
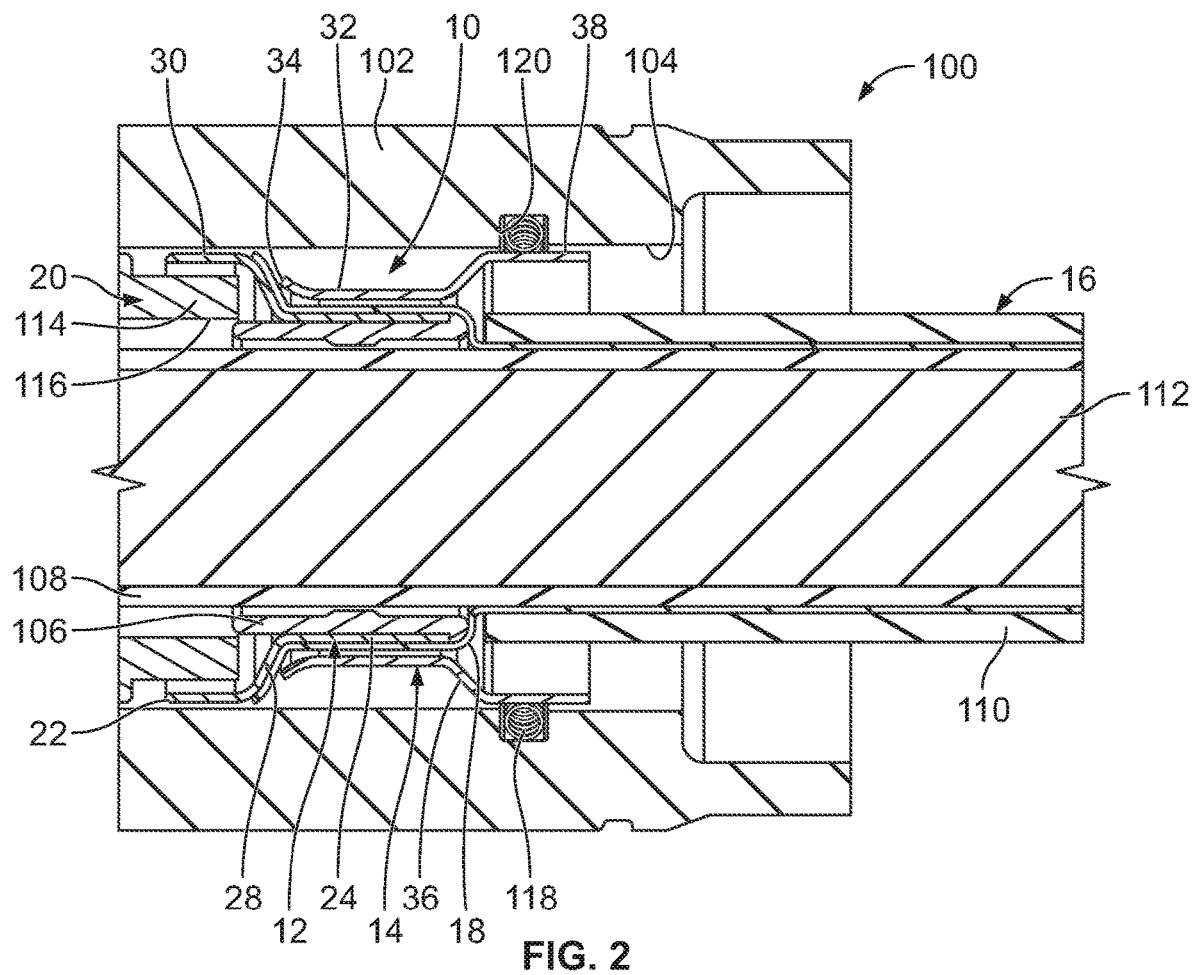
FIG. 2 is a cross-sectional side view of an example shield grounding electrical connector as disclosed herein.

FIG. 2 illustrates an example shield grounding electrical connector 100 as disclosed herein comprising the inner and outer ferrule assembly 10 that includes the inner and outer ferrules 12 and 14, as discussed above and illustrated in FIGS. 1A to 1C. The inner and outer ferrule assembly 10 is disposed within a rigid housing 102 to thereby form the connector 100. In an example, the housing 102 is a rigid structure that is formed from an electrically conductive material for purposes of providing a desired electrical grounding connection with the inner and outer ferrule assembly 10. In an example, the housing is formed from aluminum. The housing includes an inner cavity 104 that is sized to accommodate the inner and outer ferrule assembly 10 therein, and in an example the inner cavity has a cylindrical shape.

A sleeve or spacer 106 is disposed circumferentially around an inner insulating sleeve 108 of the shielded cable 16 after a portion of the cable outer insulating sleeve 110 is removed to expose a section of the cable shield 18 that is moved radially outwardly from the cable. In an example, the sleeve 106 is formed from an electrically nonconductive material and has an outside diameter sized to enable fitment of the inner ferrule neck section 24 thereover. The cable shield 18 extends axially from an end of the outer insulating sleeve 110 and extends radially outwardly from the cable inner insulating sleeve 108 where it then extends axially between and is captured by the opposed inner and outer ferrule neck sections 24 and 32.

In an example, preparation of the cable and attachment of the inner and outer ferrules to capture the cable shield portion therebetween to thereby form the inner and outer ferrule assembly is conducted prior to inserting the assembly into the housing 102, thereby forming the connector 100. As illustrated, it is desired that a portion of the cable shield portion extends along the inner ferrule, e.g., along the shoulder section 28 beyond the outer ferrule flared end 34, for purposes of providing a visual indication that the cable shield portion is adequately captured by the inner and outer ferrules. As best shown in FIG. 2, a feature of the inner ferrule shoulder section 28 and its radially outward directed configuration is that it operates to direct the cable shield portion 18 radially outwardly away from the cable so as to mitigate and avoid the possibility of the shield making contact with a main conductor 112 of the shielded cable 16, to thereby prevent an undesired short circuit.

The inner ferrule skirt section 30 is disposed within the housing inner cavity 104 and the terminal insulator 20 is connected thereto through the inner ferrule axial end 22. In an example, the terminal insulator includes an axial end 114 that is configured to fit within an inside diameter of the inner ferrule skirt section 30. A portion of the shielded cable with the shield portion removed therefrom and including the inner insulating sleeve 108 extends axially from the sleeve 106 and into and through an inside diameter 116 of the terminal insulator 20. In an example, the terminal insulator 20 may be formed from an electrically nonconductive material.

The outer ferrule 14 extends from its connection with the inner ferrule 12 along the overlapping respective neck sections 24 and 32 in an opposite axial direction from the inner ferrule within the housing inner cavity 104. In an example, a grounding electrical connection is made between the inner and outer ferrule assembly 10 and housing 102 through the use of an interconnecting element 118, wherein the interconnecting element 118 is interposed between and in electrical contact with both the inner and outer ferrule assembly 10 and the housing 102. In an example, the interconnecting element is formed from an electrically conductive material and extends circumferentially between and make contact with opposed surfaces of the assembly and the housing inner cavity. In an example, the interconnecting element 118 may be in the form of a canted coil spring that extends circumferentially within the housing inner cavity 104 between the housing 102 and the assembly outer ferrule 14, and specifically an outer surface of the outer ferrule skirt section 38. In an example, the canted coil spring is formed from and/or may be coated with an electrically conductive material capable of providing a desired electrical connection between the inner and outer ferrule assembly 10 and housing 102 to produce the desired shield grounding purpose. It is additionally desired that the canted coil spring be formed from a material capable of retaining its resilience to enable repeated use of the assembly and housing to provide the grounding electrical connection therebetween. Example materials useful for the canted coil spring include metals and metal alloys. In an example, the canted coil spring may be formed from and/or coated with copper and/or beryllium copper.

In an example, the canted coil spring 118 is disposed within a recessed groove 120 running circumferentially along the housing inner cavity 104 to maintain its placement therein and axial position when the assembly 10 is not disposed therein. In an example, the canted coil spring 118 is sized having a diameter that is sufficient to physically contact and compress against the outside surface of the outer ferrule skirt section when the assembly 10 is disposed within the housing. In an example, the outer ferrule shoulder section 36 has a degree of radially outward departure that operates to enable the assembly 10 to be moved axially within the housing inner cavity so as to engage the canted coil spring and place it into a compressed state against the outer ferrule skirt without binding. Because of the many interconnected rings extending circumferentially along and making up the canted coil spring 118, a robust electrical connection between the assembly 10 and housing 102 is assured. Further, the resilient nature of the canted coil spring and its compression against the outer ferrule operates to ensure that the electrical grounding connection between the assembly and housing forming the connector is maintained even when subjected to high levels of vibration.

Figure 3:
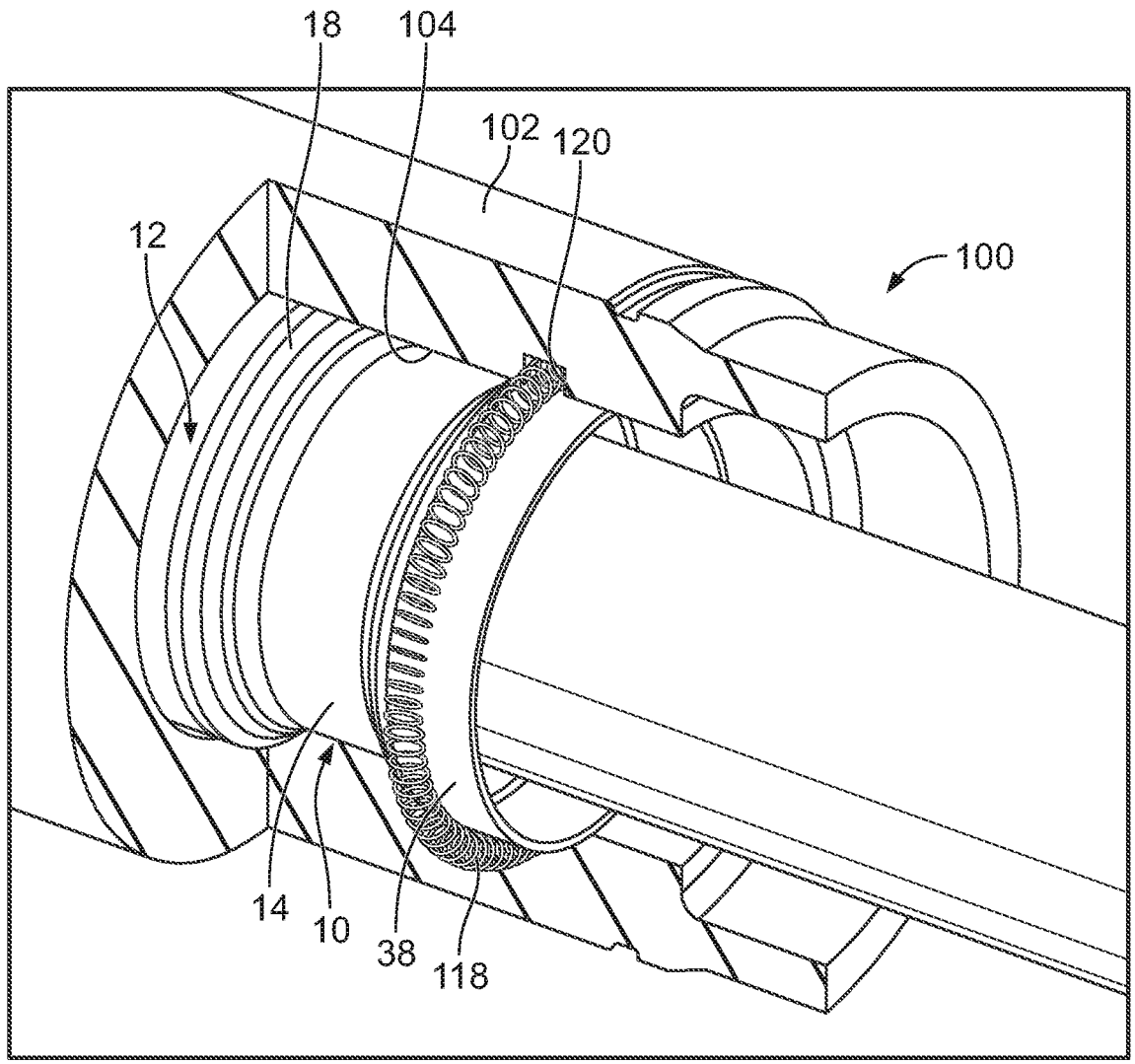
FIG. 3 is a perspective cut-out sectional view of the example shield grounding connector of FIG. 2.

FIG. 3 illustrates the example connector 100 as disclosed above and illustrated in FIG. 2. Specifically, the housing 102 inner cavity 104 is configured to accommodate placement of the assembly 10 therein comprising the combined inner ferrule 12 and the outer ferrule 14 with the cable shield portion 18 interposed and captured therebetween. Also clearly illustrated is the placement of the canted coil spring 118 within the recessed groove 120 of the inner cavity 104, and the placement of the canted coil spring circumferentially around and contacting the outside surface of the outer ferrule skirt section 38 providing a grounding electrical connection between the cable shield portion 18 captured by the assembly 10 and the housing 102 by the compression of the canted coil spring against the outer ferrule.

FIG. 4 illustrates an example shield grounding electrical connector 200 as disclosed herein comprising an inner and outer ferrule assembly 202 that is configured differently from that disclosed above and illustrated in FIG. 2. Specifically, the assembly 202 comprises an inner ferrule 204 that is configured in the form of an annular sleeve that is sized to fit over an axial end section of the shielded cable outer insulating sleeve 206 before or after a portion of the outer insulating sleeve has been removed to expose the cable shield portion 208. After the inner ferrule 204 is disposed onto the outer insulating sleeve 206, the exposed shield portion 208 is moved axially and along an outside diameter of the inner ferrule 204. An outer ferrule 210 comprising a neck section 212 is disposed concentrically over the cable shield portion 208 and inner ferrule 204, and the outer and inner ferrules are crimped together trapping the cable shield portion 208 therebetween to thereby form the assembly. The outer ferrule includes a radially outwardly extending shoulder section 214 that extends from the neck section 212, and that is a transition between the neck section 212 and a skirt section 216 that extends axially from the shoulder section.

As with the example shield grounding electrical connector disclosed above and illustrated in FIG. 2, a grounding electrical connection between the assembly 202 and the housing 218 is made through the use of an interconnecting element 220 that is interposed between the assembly and the housing inner cavity. In an example, the interconnecting element 220 is a canted coil spring that is disposed within a recessed section 222 running circumferentially along the housing inner cavity 224. Unlike the example illustrated in FIG. 2, the housing recessed section 222 operates in combination with a separate removable element 226 in the form of an annular spacer that is disposed within the housing from housing end 228 to abut against an axial edge 230 of the recessed section 222 to axially fix placement of the canted coil spring within the housing. A feature of this example assembly 202 is that both the inner and outer ferrules 204 and 210 are positioned along the same side of the shielded cable. Further, in an example embodiment, a sufficient length of the cable shield portion 208 is exposed so that it may extend along the length of the inner ferrule so that an end portion of the shield portion can be visually verified after the outer ferrule has been attached thereto. As with the example illustrated in FIG. 2, the connector outer ferrule shoulder section 214 is configured to engage and urge the canted coil spring thereover as the assembly is axially moved in the housing inner cavity and cause the canted coil spring to be compressed against the outer ferrule to form a desired grounding electrical connection that is robust and resistant to vibration.

FIG. 5 illustrates another example shield grounding electrical connector 300 comprising an inner and outer ferrule assembly 302 that is configured comprising an inner ferrule 304 in the form of an annular sleeve. The inner ferrule 304 is sized to fit over an axial end section of the shielded cable outer insulating sleeve 306 before or after a portion of the outer insulating sleeve has been removed to expose the cable shield portion 308. After the inner ferrule 304 is disposed onto the cable outer insulating sleeve 306, the exposed shield portion 308 is moved axially and along an outside diameter of the inner ferrule. An outer ferrule 310 comprising a neck section 312 is disposed concentrically over the cable shield portion, and the inner and outer ferrules are crimped together trapping the cable shield portion therebetween, thereby forming the assembly. The outer ferrule includes a shoulder section 314 that extends radially outwardly from the neck section 312, and that is a transition between the neck section 312 and a skirt section 316 that extends axially from the shoulder section.

A grounding electrical connection between the assembly 302 and the housing 318 is made through the use of an interconnecting element 320 interposed between the assembly and the housing inner cavity. In an example, the interconnecting element is a canted coil spring that is disposed within a recessed groove 322 running circumferentially along an outer surface of the outer ferrule skirt section 316. In an example, the recessed groove 322 is positioned adjacent an axial end 324 of the skirt section. Unlike the examples illustrated in FIGS. 2 and 3, the canted coil spring 320 in this example is retained on the assembly by the outer ferrule, and the desired electrical grounding connection between the assembly 302 and the housing 318 is made by insertion of the assembly within the housing inner cavity 326, and compression of the canted coil spring against the adjacent housing inner cavity surface. Like the example illustrated in FIG. 4, a feature of this example assembly is that both the inner and outer ferrules are positioned along the same side of the shielded cable. Further, in an example embodiment, a sufficient length of the cable shield portion is exposed so that it may extend along a sufficient length of the inner ferrule so that an end portion of the shield can be visually verified after the outer ferrule has been attached thereto.

A feature of shield grounding electrical connectors as disclosed herein is the configuration of the inner and outer ferrules to capture the cable shield portion therebetween in a nested manner that prevents the shield portion from contacting the cable main conductor, and in a manner that can be visually confirmed. A further feature of such shield grounding electrical connectors is the use of an electrically interconnecting element in the form of a canted coil spring to provide a robust electrical connection between the inner and outer ferrule assembly and the rigid housing, by radial compression of the canted coil spring against the assembly and housing inner cavity to thereby provide the desired electrical grounding by the connector in a manner that is resistant to high vibrations present in certain end-use cable applications to provide a highly reliable grounding connection in such applications.

The foregoing description and accompanying figures illustrate the principles, preferred embodiments and modes of operation of the shield grounding electrical connectors as disclosed herein. However, such shield grounding electrical connectors should not be construed as being limited to the particular embodiments discussed above. Additional variations of the embodiments discussed above will be appreciated by those skilled in the art. Therefore, the above-described embodiments should be regarded as illustrative rather than restrictive. Accordingly, it should be appreciated that variations to those embodiments can be made by those skilled in the art without departing from the scope of the shield grounding electrical connectors and connector housing constructions as defined by the following claims.

What is claimed is:

1. A cable shield connector comprising:
    a cable having a cable shield, an inner insulating sleeve disposed radially inwardly from the cable shield, and an inner conductor radially inward of the inner insulating sleeve;
    an inner ferrule having an inner surface and an outer surface, wherein a portion of the cable shield is disposed along at least a portion of the inner ferrule outer surface; and
    an outer ferrule comprising a section disposed concentrically around the inner ferrule and wherein the portion of the cable shield is interposed between and in direct contact with each of the inner ferrule and the outer ferrule section, the combined inner and outer ferrules forming an assembly;
    wherein the assembly is disposed in a housing and a coil spring interposed between opposed surfaces of the assembly and the housing to provide an electrical connection therebetween.

2. The cable shield connector as recited in claim 1, wherein the inner and outer ferrules are each formed from an electrically conductive material.

3. The cable shield connector as recited in claim 1, wherein the inner ferrule includes a first section that is in contact with the portion of the cable shield and a second section that extends axially away from the inner ferrule first section and that has an enlarged diameter relative to the inner ferrule first section, wherein the outer ferrule section is disposed concentrically around the inner ferrule first section.

4. The cable shield connector as recited in claim 3, wherein the outer ferrule comprises a further section that extends axially away from the outer ferrule section, and wherein the inner ferrule second section and the outer ferrule further section are oriented at axially opposed ends of the assembly.

5. The cable shield connector as recited in claim 3 comprising an annular spacer interposed between the cable inner insulating sleeve and an inner surface of the inner ferrule first section.

6. The cable shield connector as recited in claim 3, wherein the outer ferrule section includes a terminal end that is flared outwardly to complement an outer surface of the inner ferrule outside surface, and wherein a portion of the cable shield is interposed therebetween.

7. The cable shield connector as recited in claim 1, wherein the cable further comprises an outer insulating sleeve radially outwardly from the cable shield, and wherein the inside surface of the inner ferrule is disposed over the outer insulating sleeve and the portion of the cable shield is disposed around a terminal end of the outer insulating sleeve and onto the outer surface of the inner ferrule.

8. The cable shield connector as recited in claim 1, wherein the housing comprises an internal cavity and wherein the assembly is disposed within the internal cavity.

9. The cable shield connector as recited in claim 8, wherein the coil spring is a canted coil spring extending circumferentially between and contacting opposed surfaces of the assembly and the housing inner cavity, and wherein the canted coil spring is at least partially disposed within a recessed section of the housing inner cavity.

10. The cable shield connector as recited in claim 8, wherein the wherein the coil spring is a canted coil spring extending circumferentially between and contacting opposed surfaces of the assembly and the housing inner cavity, and wherein the canted coil spring is at least partially disposed within a recessed section along an outer surface of the outer ferrule.

11. A cable shield connector, comprising:
a cable having a cable shield, an inner insulating sleeve disposed radially inwardly from the cable shield, and an inner conductor radially inwardly from the inner insulating sleeve;
an inner ferrule having an inner surface and an outer surface, wherein a portion of the cable shield is disposed along at least a portion of the inner ferrule outer surface;
an outer ferrule positioned radially outwardly of the inner ferrule, wherein the outer ferrule includes a section that is disposed concentrically around a portion of the inner ferrule, wherein the portion of the cable shield is interposed between and in direct contact with each of the inner ferrule outer surface and the outer ferrule section, and wherein the combined inner and outer ferrules and the portion of the cable shield form an assembly; and
a housing having an inner cavity, wherein the assembly is disposed within the inner cavity, and wherein an electrically conductive canted coil spring is interposed between opposed surfaces of the assembly and the housing inner cavity to provide a grounding electrical connection therebetween.

12. The cable shield connector as recited in claim 11, wherein the inner ferrule includes a first section and a second section, and wherein the outer ferrule section is disposed radially around the inner ferrule first section, and wherein the inner ferrule second section and a further section of the outer ferrule that extends axially from the outer ferrule section are disposed at opposed axial ends of the assembly.

13. The cable shield connector as recited in claim 12, wherein a terminal end of the outer ferrule section is configured to connect with an outer surface of the inner ferrule second section with the portion of the cable shield interposed therebetween.

14. The cable shield connector as recited in claim 11, wherein the cable further comprises an outer insulating sleeve radially outwardly from the inner insulating sleeve, and wherein the inside surface of inner ferrule is disposed over the outer insulating sleeve and the portion of the cable shield is disposed around a terminal end of the outer insulating sleeve and onto the outer surface of the inner ferrule.

15. The cable shield connector as recited in claim 11, wherein the canted coil spring extends circumferentially between the assembly and the housing inner cavity, wherein the canted coil spring is in contact with the outer ferrule, and wherein the canted coil spring axial position is fixed relative to one of the assembly and the housing.

16. The cable shield connector as recited in claim 15, wherein the canted coil spring is disposed and fixed axially within one of a recessed section of the outer ferrule and a recessed section of the housing inner cavity.

17. A method for providing an electrical connection with a cable shield connector comprising the steps of:
interposing a cable shield of a cable between an outer surface of an inner ferrule and an inner surface of an outer ferrule disposed radially outwardly around a portion of the inner ferrule surface in contact with the cable shield, wherein the cable shield is insulated from a cable inner conductor by an inner insulating sleeve that is radially interposed therebetween, and wherein the combined cable shield and the inner and outer ferrules form an assembly; and
inserting the assembly into an inner cavity of a housing thereby causing an interconnecting element to make contact between the assembly and the housing inner cavity to form an electrical connection between the assembly and housing, and wherein the interconnecting element is an electrically conductive element interposed between the housing inner cavity and an outer surface of the assembly and at least partially radially disposed in one of a recessed section housing inner cavity and a recessed section of the assembly.

18. The method as recited in claim 17, wherein the interconnecting element is a canted coil spring and, wherein during the step of inserting the assembly, the assembly is axially disposed into the housing inner cavity causing the canted coil spring to be compressed between the housing and an outer surface of the assembly to form the electrical connection therebetween.

19. The method as recited in claim 17, wherein the interconnecting element is a canted coil spring that is disposed within a recessed section of the housing inner cavity and, wherein during the step of inserting the assembly, the assembly is inserted axially within the housing and the canted coil spring is compressed against an outside surface of the assembly outer ferrule.

20. The method as recited in claim 17, wherein the interconnecting element is a canted coil spring that is disposed within a recessed section of the assembly and, wherein during the step of inserting the assembly, the assembly is inserted axially within the housing and the canted coil spring is compressed against the inner cavity of the housing.

\* \* \* \* \*